（12）United States Patent
Booton (10) Patent No.: US 9,350,854 B2
(45) Date of Patent: May 24, 2016

(54) CALL BARRING (75) Inventor: Laurence J. Booton, Woodbridge (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 290 days.

(21) Appl. No.: 13/260,619

(22) PCT Filed: Mar. 9, 2010

(86) PCT No.: PCT/GB2010/000418
§ 371 (c)(1),
(2), (4) Date: Sep. 27, 2011

(87) PCT Pub. No.: WO2010/109161
PCT Pub. Date: Sep. 30, 2010

(65) Prior Publication Data
US 2012/0020351 A1 Jan. 26, 2012

(30) Foreign Application Priority Data
Mar. 27, 2009 (GB) .................................. 0905270.5

(51) Int. Cl.
H04M 7/00 (2006.01)
H04M 3/38 (2006.01)

(52) U.S. Cl.
CPC .............. *H04M 3/38* (2013.01); *H04M 7/0012* (2013.01)

(58) Field of Classification Search
CPC ............................... H04M 3/38; H04M 7/0012
USPC .......................................... 370/352–356, 329
See application file for complete search history.

(56) References Cited

U.S. PATENT DOCUMENTS

| 5,918,228 | A | 6/1999 | Rich et al. |
| 6,233,450 | B1* | 5/2001 | Seppanen ................. 455/426.1 |
| 6,330,442 | B1* | 12/2001 | Seppanen ................. 455/426.1 |
| 7,039,714 | B1 | 5/2006 | Blakley, III et al. |

(Continued)

FOREIGN PATENT DOCUMENTS

| GB | 2 394 141 | 4/2004 |
| WO | WO 97/13352 | 4/1997 |

(Continued)

OTHER PUBLICATIONS

Search Report (1 pg.) dated Jun. 22, 2009, issued in GB Application No. GB0904559.2.

(Continued)

*Primary Examiner* — Khaled Kassim
(74) *Attorney, Agent, or Firm* — Nixon & Vanderhye P.C.

(57) ABSTRACT

A application relates to call barring. Typically, PBX systems have the ability to bar calls originating from both an individual phone and group of phones. However, with nomadism/hot-desking in large organisations comprising typically many PBXs, often from different manufactures, a PBX base call barring solution is unworkable. Consequently, a computer telephony based solution has been chosen. The call barring is performed on the CTI server (1) which receives from the user via a computer terminal (10) a request to set up a call from a source telephone terminal (12) to a destination telephone terminal (8). The CTI server allows or blocks the call set-up request according to the call barring settings and forwards allowed call set-up requests to the PBX (4), whereby the CTI server overrides the PBX call barring settings.

17 Claims, 4 Drawing Sheets (56) References Cited

U.S. PATENT DOCUMENTS

| | | |
|---|---|---|
| 7,274,928 B2* | 9/2007 | Netanel et al. ............... 455/415 |
| 2002/0101866 A1* | 8/2002 | Miloslavsky et al. ......... 370/386 |
| 2003/0014528 A1 | 1/2003 | Crutcher et al. |
| 2004/0042414 A1* | 3/2004 | Bouret et al. ................. 370/252 |
| 2004/0071281 A1* | 4/2004 | Rashid ..................... 379/210.02 |
| 2004/0117493 A1 | 6/2004 | Bazot et al. |
| 2004/0213398 A1* | 10/2004 | Tsuruhara .................... 379/225 |
| 2006/0045076 A1* | 3/2006 | Lim ............................. 370/352 |
| 2006/0270390 A1* | 11/2006 | Lai et al. .................... 455/414.1 |
| 2007/0092073 A1* | 4/2007 | Olshansky et al. ........... 379/232 |
| 2007/0283421 A1 | 12/2007 | Hirose |
| 2008/0118046 A1 | 5/2008 | Katkam et al. |
| 2010/0048180 A1* | 2/2010 | Sapkota et al. ............... 455/413 |

FOREIGN PATENT DOCUMENTS

| | | |
|---|---|---|
| WO | WO 02/45399 | 6/2002 |
| WO | 2008/036947 | 3/2008 |

OTHER PUBLICATIONS

International Search Report (7 pgs.) dated Aug. 3, 2010 issued in International Application No. PCT/GB2010/000417.

Sommerlad, Peter, *"Reverse Proxy Patterns"*, EuroPLoP Papers, 2003, XP002591797, Retrieve from the Internet: URL: http://hillside.net/europlop/HillsideEurope/Papers/EuroPLoP2003/2003_Sommerlad_ReverseProxyPatterns.pdf [retrieved on Jul. 13, 2010], 27 pgs.

International Search Report for PCT/GB2010/000418, mailed May 27, 2010.

* cited by examiner

CALL BARRING

This application is the U.S. national phase of International Application No. PCT/GB2010/000418, filed 9 Mar. 2010, which designated the U.S. and claims priority to GB Application No. 0905270.5 filed 27 Mar. 2009, the entire contents of each of which are hereby incorporated by reference.

BACKGROUND AND SUMMARY

The present invention relates to the field of computer telephony in general and to policing call requests arising in computer telephony networks.

The control of unauthorised calls made from phones in a corporate phone system, such as a company phone system comprising a number of phones has long been seen as a problem. In a corporate environment, unauthorised phone calls constitute a number of risks. This can be from a number of perspectives:

cost (i.e. accessing high charge-rate destinations: international, premium rate);

time (i.e. working time spent on unauthorised, personal calls);

regulation/compliance (i.e. unauthorised phone calls breaching industry regulations).

Typically, phone systems have the ability to bar calls originating from both an individual phone and a group of phones. An inherent weakness in such systems is that an individual assigned a phone to which call barring is applied may go around the organisation trying different phones, until one is found that allows the desired type of call.

To address this weakness, some PBX vendors have introduced a concept whereby a, use can "register" on a phone of their choosing using a unique, confidential code (PIN). On registering, the phone effectively becomes theirs, i.e. it takes on their extension number and is assigned their personal settings, including their call barring status.

This is only a partial solution to the problem. User registration can be effective in a small organisation whereby all the users share one, suitably-equipped PBX. However, in large organisations, there will be typically many PBXs, often from different manufacturers and in different versions, rendering the registering of any phone unworkable.

Another potential solution would be to set up an automated bureau service whereby individuals dial a particular number, identify themselves using a PIN, key in the number they wish to dial and, if this is an authorised number for use by that user, the service will then place the call on their behalf.

Although effective, this is clearly a tedious way of making calls and has very significant drawbacks where calls are often made in an automated fashion (e.g. from the user's PC using a computer-telephony client and a directory of contacts or Instant Messaging client application such as OC (Office Communicator from Microsoft). In a conventional CTI system, a user can use their computer terminal to request an outgoing call to be set up from a telephony terminal registered in association with the user's computer terminal. A CTI controller responds to the computer-originated request by commanding a PBX that serves the user's environment to set up a call from the appropriate telephony terminal. These automated call systems will obviously not work if the phone associated with the client defaults to a state in which some calls (e.g. all chargeable calls) are barred requiring the user to enter their security details manually to a bureau service.

Current practices for call barring in a computer telephony environment are inadequate and problematic and there is a need for a method of allowing call barring based on an individual's permissions in automated dialling environments.

A system and corresponding method are proposed for policing call requests originating in a computer telephony (CTI) system, in which the computer telephony system comprises a plurality of computer terminals and a plurality of telephone terminals. The system for policing call requests comprises a store for storing a set of permissions associated with a user; and for storing a registration associating a computer terminal with a source telephone terminal. The system also comprises a CTI server for receiving from the user via the computer terminal a request to set up a call from the source telephone terminal to a destination telephone terminal. The call set-up request comprises a user identifier associated in the store with the set of permissions. The CTI server is arranged in use to compare the call set-up request with the set of permissions; and to allow or block the call depending on the permissions.

The method includes receiving at a CTI server from the user via one of the computer terminals a request to set up a call to a destination telephone terminal; in which the request identifies the user. The CTI server compares the call set-up request with the set of permissions associated with the user; and allows or blocks the call depending on the permissions.

According to a further aspect, the call request is associated with a source telephone terminal and a number identifying the destination telephone terminal; in which the source telephone terminal is an extension to a PBX, in which the CTI server forwards an allowed call request to the PBX. According to this further aspect, the PBX comprises call barring settings relating to the source telephone terminal, in which the CTI server overrides the PBX call barring settings.

According to a further aspect, the CTI server directs the PBX to route the requested call via a second PBX. According to a further aspect, the second PBX allows or blocks the call depending on the result of a comparison of the call set-up request with the set of permissions associated with the user. According to a further aspect, the second PBX allows or blocks the call depending on the result of checking call validation data provided by the CTI server.

BRIEF DESCRIPTION OF THE DRAWINGS

In order to aid understanding, embodiments of the invention will now be described by way of example with reference to the drawings in which.

DETAILED DESCRIPTION OF PRESENT EXAMPLE EMBODIMENTS

Figure 1:
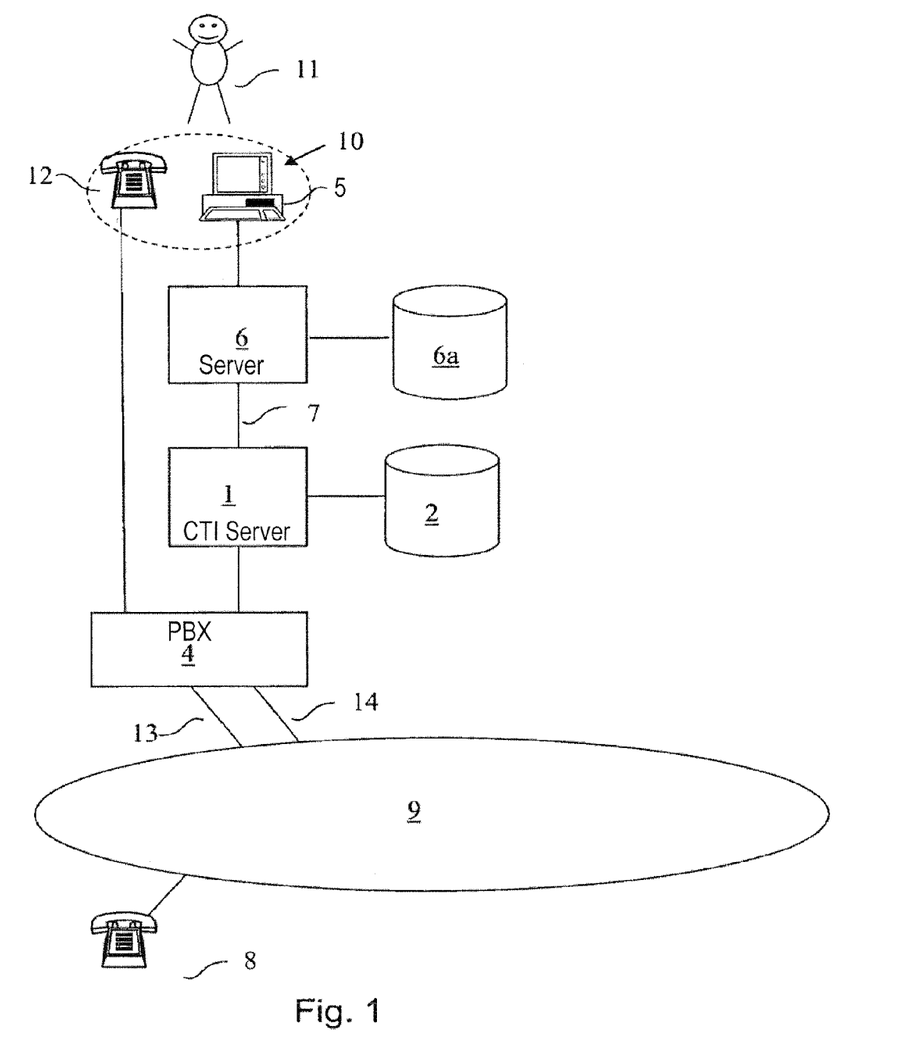
FIGS. 1 and 2 shows schematics of networks providing call barring according to the invention.

A first embodiment will now be described with reference to FIG. 1. As shown in FIG. 1, user 11 has access to telephone terminal 12 and a processing device, e.g. PC 5. PC 5 may run a variety of applications including web browsers, email clients and associated software including a client 10. Client 10 is the client for IM server 6, such as Office Communications Server (OCS) and Live Communications Server (LCS), both from Microsoft. A common adjunct to web and email applications is a list of contacts. For IM applications the list of contacts is sometimes referred to as a "buddy list" and this is also included on PC 5. Telephone terminal 12 is connected for making telephone calls via local PBX 4 to a public telephone network (ISDN/PSTN Network 9). Local PBX 4 is connected to ISDN/PSTN Network 9 via ISDN trunk 13. Telephone terminal 12 may be referred to as an extension to local PBX 4. PC 5 is connected to CTI server 1 for initiating computer-telephony events via LCS OCS server 6. LCS OCS server 6 is associated with database 6a, such as Active Directory from Microsoft. CTI server 1 is also connected to local PBX 4 for implementing computer-telephony events and to database 2 (such as an Oracle database) for storing internal records relating to computer-telephony activities.

Interconnectivity between CTI server 1, database 2, LCS OCS server 6 and local PBX 4 and between LCS OCs server 6 and Active Directory database 6a; is provided via the company internal data network 7, for example an Ethernet LAN.

In order to use an IM client such as OC client 10, a user first needs to authenticate themselves on that client, typically by submitting, a user name and password that is then checked by OC server 6 against relevant records held in database 6a. Once the user is securely authenticated on OC client 6, they also need to register the phone they want to use for CTI operations. Typically this means the user's credentials, such as username and password, are passed to CTI server 1 as part of a registration process and authenticated against a record held in database 2. International patent publications WO99/51015 and WO02/076071 in the name of British Telecommunications discloses suitable methods of registering the identity of a telephone terminal in association with the identity of a computer terminal.

If phone registration is successful, user 11 can now be regarded as authorised to control telephone terminal 12 via PC 5 and CTI server 1. When the authenticated user initiates a request from PC 5 to set up a telephone call to another party, e.g. by clicking on a "buddy" icon in OC client 10, the request received by CTI server 1 will contain the SIP URI of the user as well as the destination number of the selected buddy (both inserted by OC Client 10). The SIP URI provides the authenticated identity of the person wishing to make the call. The connection 7 between CTI server 1 and LCS Server 6 is secure so as to avoid fraudulent use of this user's SIP URI, i.e.: by a user at another computer. International patent publication WO2007/110567 in the name of British Telecommunications describes how, from a particular user's SIP URI, we can identify the extension number of a phone assigned to a user requesting a call.

We now describe how user 11 sets up a telephone call via CTI server 1. The user first selects a destination (e.g. a colleague or friend from the "buddy list"). According to this example, the destination happens to be remote (i.e. international) telephone terminal 8 that, in common with local PBX 4, has a connection to ISDN/PSTN Network 9. The normal external dialling prefix (say 9) is appended to the destination directory number in the request. User 11 passes a telephony request identifying the destination via IM client 10 and LCS server 6 to CTI server 1. In order to check the user's permissions, CTI server 1 searches in associated database 2 for the SIP URI received in the request from the user's IM Client 10. Database 2 is preconfigured as to the calls each user (as identified by SIP URI in this example) is permitted to make, i.e. with reference to a call barring table. Database 2 is also preconfigured as to the destinations barred by local PBX 4: typically these will be specified with reference to the PBX extension at which the call originates. In this example, the call barring table held in database 2 indicates that user 11 is permitted to make international calls. CTI server 1 then commands local PBX 4 to set up a call to the required destination from the extension registered to user 11, which in this example, is extension 12. However, the conventional call barring applied by local PBX 4 to telephone terminal 12 may exclude international calls, so that local PBX 4 will block the call, even though the user is permitted to access that destination.

As shown in FIG. 1, a second ISDN trunk 14 is configured from local PBX 4 to ISDN/PSTN network 9. According to this approach, all calls made over second ISDN trunk 14 are enabled by local PBX 4, whether for international or local calls. To provide a level of security, second ISDN trunk 14 is allocated a special, hidden prefix (for example "9229") known only to CTI server 1. If CTI server 1 determines, as set out above, that a user is authorised to make international calls (i.e. as indicated by the call barring table in database 2), CTI server 1 automatically appends the special prefix (for example 9229) rather than the standard prefix (typically 9) to the dialled digits forwarded to local PBX 4. When local PBX 4 receives the call setup request from CTI server 1, it responds to the presence of the special prefix by setting up the call via second ISDN trunk 14.

This method achieves the desired user-specific call barring, however, a malicious user could, for example, try different prefixes until one was found that allowed access to second ISDN trunk 14. Furthermore, the prefix might actually be visible on the display of extension 12, for example, if it is a PBX Feature Phone.

Figure 2:
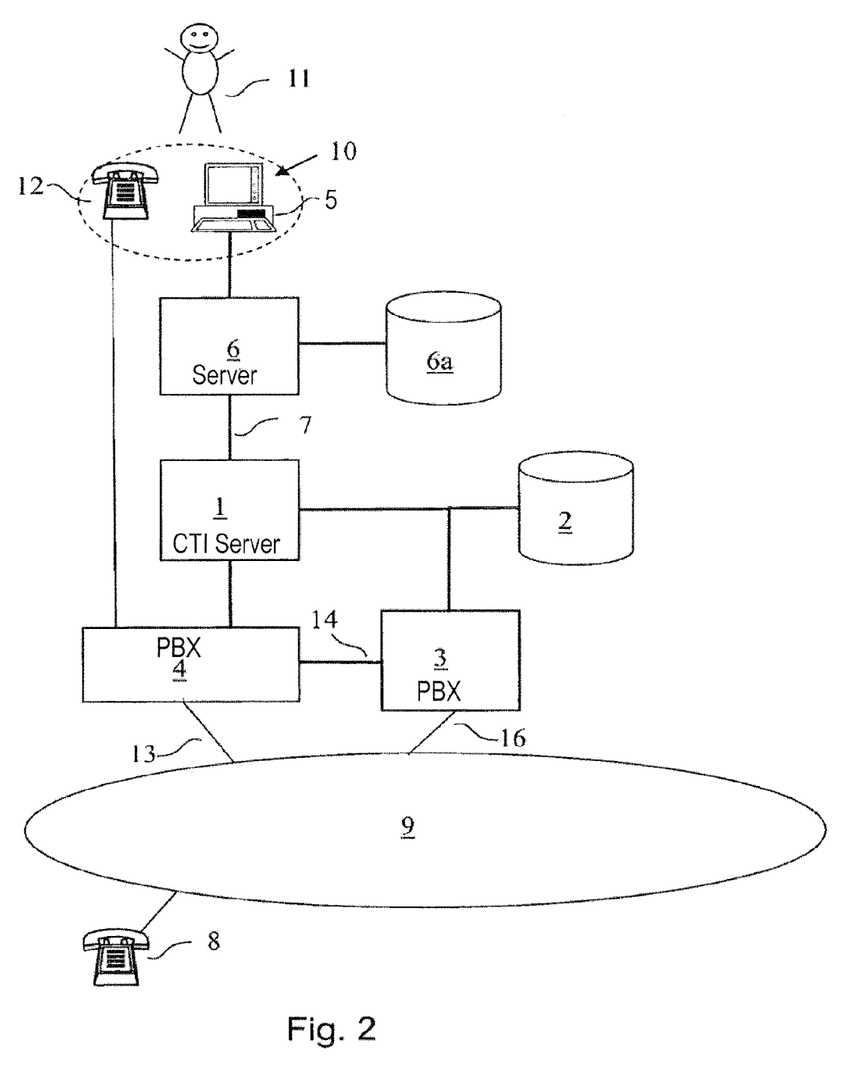

A further embodiment will now be described with reference to FIG. 2. FIG. 2 shows the same basic CTI system as FIG. 1 but now with an additional telephony switching device 3—typically a PBX with special characteristics. For the purposes of this description, we shall refer to telephony switching device 3 as the "added PBX", although it might actually be an existing PBX which happens to have the required capabilities. PBXs 4 and 3 may comprise separate pieces of equipment or be integrated as distinct functions within a single PBX. Examples of added PBX 3 are described later.

Interconnectivity between PBXs 3 and 4 is provided via internal company telephone network 15. Interconnectivity between added PBX 3, database 2 and CTI server 1 is provided via internal data network 7. PBX 3 is also connected directly to ISDN/PSTN network 9 via trunk 16 over which international calls are enabled.

During the call set-up process, CTI server 1 checks to see if the destination number selected by user 11 via client 10 is one of the numbers identified in database 2 as being barred by local PBX 4 (e.g. a number for an international destination). If CTI server 1 finds that the user-selected destination number is barred, either universally or specifically for extension 12, it checks to see if the destination number is recorded in the user's call barring profile in database 2 as an allowed destination.

If the user's call barring profile indicates that the user is not authorised to access the restricted destination, CTI server 1 appends standard routing digits (for example "9") to the dialled digits. The standard routing digits cause the call to be routed to the normal telephony switching device, local PBX 4, where the call will be blocked. If the user's call barring profile indicates that the user is authorised to access the restricted destination, CTI server 1 has to achieve a call to a destination that is barred by local PBX 4. To achieve this, CTI server 1 appends, as before, special routing digits (for example "9229") to the normal dialled digits.

According to this embodiment, the special routing digits cause the call to be routed via internal company telephone network 15 to added PBX 3. For example, CTI server 1 would typically make a request to PBX 4 for source extension 2000 to call destination 94490014441234, instead of the more normal 90014441234. While local PBX 4 would see a number starting "900 . . . " as relating to as international destination, it does not identify numbers starting "9449 . . . " as international and so does not block the call.

According to a simplified embodiment, on receipt of the call from local PBX 4, added PBX 3 uses a SIP or ISDN message to place the call to destination 8 via PSTN/ISDN 9. Added PBX 3 does not, according to this simplified embodiment, carry out any further checks on call requests received from local PBX 4 associated with a "9449" number. According to this, simplified embodiment, no interconnection is required between added PBX 3, database 2 and CTI server 1. It would be more secure, however, if added PBX 3 were to carry out its own checks that the call is permitted before the placing the call. Further embodiments will now be described that provide such additional security checks.

The following embodiments will be described with reference to International standard ECMA-269, 7th edition, December 2006, "Services for Computer Supported Telecommunications Applications" (ECMA CSTA). ECMA CSTA will be familiar to workers in the field of the computer-telephony.

Figure 3A:
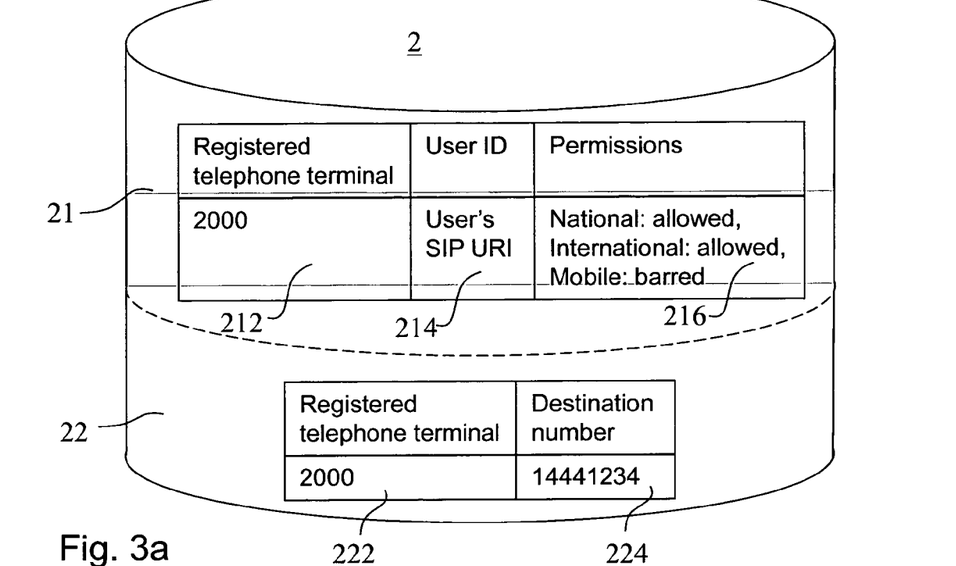
FIGS. 3*a* and 3*b* show database schema according to the invention.

According to this embodiment, database 2 has two sections, as shown in FIG. 3a. One, permanent section 21 records permissions associated with a user. A second, transient section 22 is provided where CTI server 1 writes, permission details relevant to the current call. In more detail, permanent section 21 comprises registered telephone terminal field 212, user ID field 214 and permissions field 216. Transient section 22 comprises registered telephone terminal field 222 and destination number field 224.

When, in response to a specific CTI call setup request from a user, CTI server 1 verifies that a particular destination number is permitted for a particular user (i.e.: by reference to permanent section 22 of database 2), CTI server 1 writes these details of permissions related to the specific call request (e.g. user 11, extension 12 and destination number 8) to transient section 22 of database 2.

According to the present embodiment, call-specific permission details are only held in database 2 for a relatively short timeframe, say 10 seconds.

When the requested call arrives at added PBX 3, the added PBX does not immediately place the call but, according to the present embodiment, first, checks the call-specific permissions held in transient section 22 of database 2. This could be done, for example, by added PBX 3 (or an application associated with it) making a SQL query to database 2 either directly, or alternatively, via CTI server 1. The query from added PBX 3 to database 2 will need to identify the caller and the proposed destination, however, added PBX 3 only has access to the call parameters contained in the call request received from local PBX 4. These parameters, in turn, are restricted to those that CTI server 1 is able to provide via PBX 4. Internal company telephone network 15 cannot pass the user identity over the network between local PBX 4 and added PBX 3, so that leaves, typically, a combination of the extension number of calling PBX extension 12 and the destination number. This leads to a problem as this combination may easily recur during the course of a day, however, the combination has a very high probability of being unique over the 10 second timeframe imposed on entries to transient section 22 of database 2. As a result, by referring to transient section 22 of database 2, added PBX 3 is able to verify to a high degree of probability that a call request relates to a specific, authenticated user and hence is able to accurately identify whether the call is a permitted call.

Once the call request has been authenticated by added PBX 3, it places the call to desired destination 8 via trunk 16 and PSTN/ISDN 9 in the normal way.

Typically, in an organisation, employees may. not have a fixed desk, but may sit at any free desk and therefore will use whatever PBX extension is available at that desk. As a result, employees will often not use the extension permanently allocated to them, i.e. they may have extension 3033 permanently assigned to them in the corporate directory but, today, they happen to be sitting at extension 2000.

According to a further embodiment, in the SIP or ISDN message used by added PBX 3 to place the call via PSTN/ISDN 9, added PBX 3 can overwrite the extension number (or CLI) registered to the user (e.g.: 2000) with the extension number (e.g.: 3033) assigned to the user. Typically both extension numbers are recorded in permanent section 21 of database 2. CTI server 1 has details of user 11 as a result of the authentication process (i.e.: extension number, 3033, assigned to that user) and as a result of the registration process (i.e.: extension number, 2000, registered to that user). Added PBX 3 is therefore able to retrieve from database 2, the extension number assigned to the user.

Finally, added PBX 3 can mark the record of the call-specific permission in transient section 22 of database 2 as relating to a "completed call", making the particular, call-specific permission unavailable for use in association with another call and, thereby, preventing its exploitation by a malicious user.

Figure 3B:
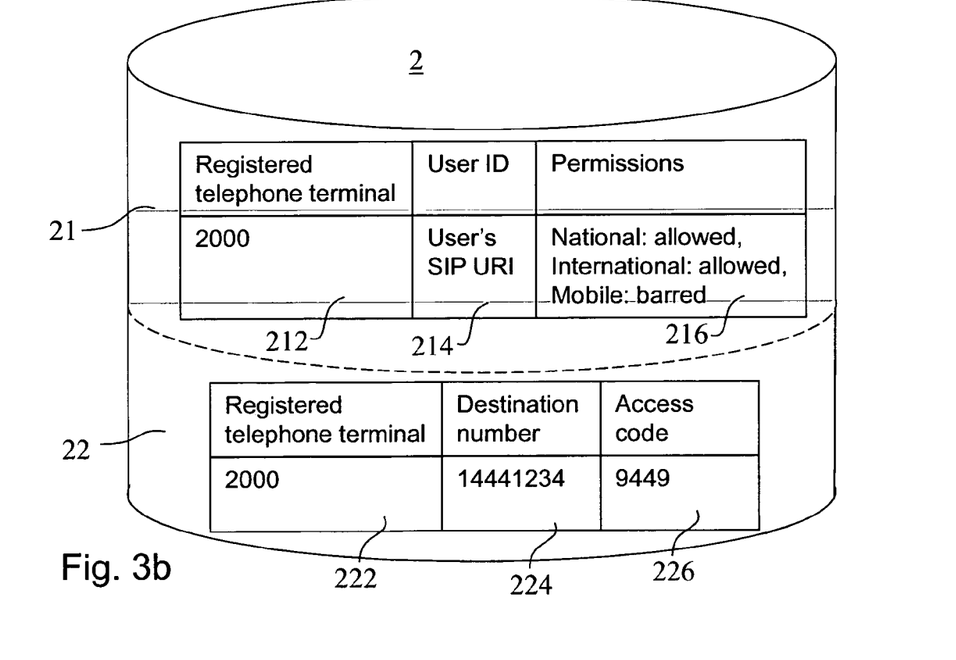

As an additional security measure, it is possible to provide a range of numbers (routing digits) that are used to put a call via added PBX 3. For example, rather than just having an access code of 9449, a range of 20 codes, i.e.: 9449 to 9469, could be used. Database 2 is modified, as shown in FIG. 3b to include in transient section 22 a field 226 for the access code. With this additional security measure, when CTI Server 1 places the call via added PBX 3, it can randomly select one access code from the range when placing the call. CTI Server 1 writes the selected access code to transient section 22 of database 2 so that, when added PBX 3 receives the call, it is able to match the access code received from local PBX 4 against the database record. It will be apparent that having a larger range of access codes will provide improved security.

In the above, if the call request is rejected by CTI server 1, following reference to permanent section 22 of database 2, due to the calling individual not having permission to make a call to the destination specified in the call request, CTI server 1 could elect to either:
  a) Place the call through local PBX 4, where it would receive a rejected tone, (e.g. NU for the UK);
  b) Not place the call (in order to save telephony resources), but to send appropriate CTI signalling back to the client 10, to indicate the call has failed. Typically this would be "CSTA Failed" (i.e. indicating that call progression has stalled, e.g. that the outgoing call attempt has encountered a busy endpoint); or
  c) Use an IVR dialogue (for example, provided by added PBX 3) to challenge the user for additional authentication information, i.e. a PIN or even a credit card number.

Added PBX 3, like local PBX 4, may be a traditional circuit-switched PBX such as the Meridian from Nortel Networks Corporation of Toronto, Canada or the SX2000 from Mitel Networks Corporation of Kanata, Ontario Canada. Alternatively, it could be an IP telephony device, such as VoIP AVVID from Cisco Systems, Inc., of San Jose, Calif., USA. Added PBX 3 could equally be a SIP Server, IVR server or, indeed, any device that has a CTI interface and which allows the interception and control of calls.

According to a further embodiment, added PBX 3 directs to a CSTA route point a request relating to each call routed from local PBX 4 to Added PBX 3. The route point responds to receipt of the request from added PBX 3 by halting normal processing by PBX 3 of the call and by generating a CSTA route request. The CSTA route request is sent by PBX 3 to CTI server 1, putting CTI Server 1 in control of the routing of the call through Added PBX 3. CTI server 1 checks whether the call is allowed or not with reference to transient section 22 of database 2.

As noted previously, the call request and hence the CSTA route request typically contains the identity (e.g. "extension 2000") of the calling device (e.g. telephone terminal 12) and the destination number (e.g. 94490014441234). Under control of CTI Server 1, once the decision has been made to allow the call (according to the user-specific permissions in database 2), CTI server 1 replies to the CSTA route request by sending a CSTA route select back to added PBX 3. The CSTA route select contains the desired destination number (e.g. 0014441234) and a suitable access code to place the call from PBX 3 on trunk 16 to PSTN/ISDN 9 (e.g. 9449). Advantageously, the access codes used by Added PBX 3 to route calls to ISDN/PSTN 9 would not be visible to users of extensions to local PBX 4, thereby increasing security.

The ability of an unauthorised user of device 12 to get access to trunk 16 to ISDN/PSTN Network 9 by trying various access codes to route a call to added PBX 3 and, then, trying various additional access codes to route the call from Added PBX 3 via trunk 16 would be limited by standard PBX routing restrictions. The CSTA route point used could also be given call permissions to unrestricted destinations under the control of CTI server 1.

Alternatively, Added PBX 3 could be a telephony platform with added software to control call routing. The way such a device routes calls is commonly known as a "dial plan". Commands can be added to a dial plan to: extract the appropriate dialled digits, to query third party systems (i.e. database 2 and/or CTI Server 1) and to take decisions on the routing of calls. The adapted telephony platform intercepts communications (i.e.: incoming call request) and implements the processes described above with reference to added PBX 3. An appropriate telephony platform may be written based on a standard such as the SIP standard and using an appropriate programming language such as ANSI C.

According to an alternative, simpler implementation, CTI Server 1 does not write an access code to a transient section of database 2. According to this implementation, instead of checking for an access code in database 2, added PBX 3 uses the extension number (e.g.: 2000) of calling PBX extension 12 identified in a call request. PBX 3 looks up in database 2 the user's registered extension number (e.g.: 2000) and obtains the permissions of user 11 associated with the registered extension number. Added PBX 3 then reads the destination number identified in the call request and checks that the call specified in the call request is permitted.

In the description of the above embodiments, the CTI Client may typically be an IM Client, which identifies users by SIP URI. However, there are other ways in which users may invoke telephony requests from the desktop. Typically these may be from a web browser such as Mozilla Firefox or Microsoft Internet Explorer. We now describe a process whereby calls initiated from a browser may benefit from this invention.

When a user registers for URI-based dialling, they enter their username/password as part of a registration process. That username/password is checked by a server and, if appropriate, the user is authenticated. Published International patent application WO2007/110567 by the present applicant covers a scheme for registration of a user in which the user's. SIP URI is stored as a registration key and is thereafter used to identify the user in computer-telephony call requests.

Earlier CTI-related schemes, as detailed in International patent publications WO99/51015 and WO02/076071 describe how a cookie acting as a record of the user's registration is written and stored in the user's browser. When the user uses a "Clicks-to-Call" function to initiate, from a web page, a telephone call to a selected number, a copy of the user-registration cookie is sent with a call request to CTI Server 1. At that point, CTI server 1 checks the content of the cookie with a record of the original registration held in database 2. If a valid registration is found matching the details contained in the cookie, database 2 will record the authenticated username associated with that registration allowing CTI server 1 to check if the requested call (as defined by the duple of the calling user's identity and the destination number) is permitted. The process from this point is as described, above.

In the above description, only one corporate (local) PBX 4 has been considered (excluding Added PBX 3). In reality, within a corporation, there may be tens or even hundreds of such corporate PBXs. According to a further embodiment, the CTI system of the present invention can connect to any number of PBXs so as to extend the benefits of CTI-controlled call barring throughout an enterprise-wide telephony system or other large telephony system. Whilst the invention is most effective if all of these PBXs are CTI enabled, an embodiment will now be described where one or more corporate (local) PBX is not CTI enabled.

According to this embodiment, local PBX 4 is not CTI enabled and Added PBX 3 is used to set up the call. In more detail, according to this embodiment, user 11 clicks on a buddy icon or on a link on a web page to initiate a call, as described above. CTI server 1 receives the request from user PC 5 and takes the decision that the call is allowed according to the user's permissions (i.e.: with reference to database 2). However, CTI server 1 identifies that the extension indicated as the source of the call (i.e.: extension 12, registered with the user) does not have CTI capability on local PBX 4 which it is currently connected to. According to this embodiment, CTI server 1 instructs added PBX 3 to call telephone terminal 12, registered with user 11. User 11 answers the call on telephone terminal 12 from added PBX 3. Added PBX 3 detects telephone terminal 12 going off-hook and places the call to the desired destination (for example telephone terminal 8).

Incoming Call Barring

All of the embodiments so far, describe the invention in terms of out-bound calls. Dialled Number Identification Service (DNIS) is a telecoms service that provides a corporate user with the number dialled by a caller. When an in-bound call passes through added PBX 3 the number dialled by the caller can be extracted from the telephony signalling associated with the call using DNIS. Added PBX 3 can identify, from the number dialled by the caller, the intended recipient. An appropriately configured database is provided to allow added PBX 3 to determine if a particular user is allowed incoming calls from the source number identified by information in the telephony signalling. According to a further embodiment, call-barring of in-bound calls is further qualified according to other factors, e.g.: the time of day, etc.

Figure 4:
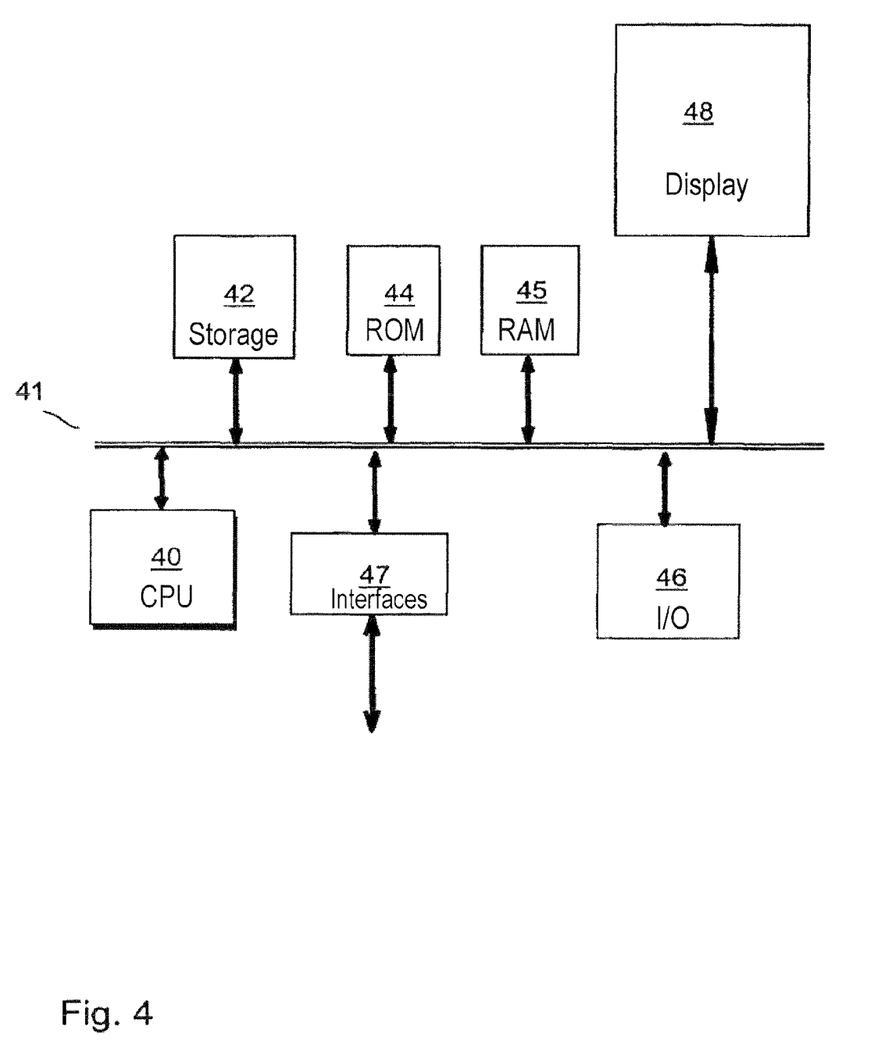
FIG. 4 shows a schematic of a server for implementing the invention.

As will be understood by those skilled in the art, PC 5, CTI server 1 and LCS OCS server 6, described above, may each be implemented as one or more commercially available server or similar general-purpose processing means, as illustrated in FIG. 4. Modern, digital switches, such as local PBX 4 and additional telephony switching device 3 may similarly be based on a processor architecture, as illustrated in FIG. 4. FIG. 4 shows a typical architecture for a server suitable for implementing the above components of the computer telephony system according to a further embodiment of the invention. In practice, a number of such servers will typically be required. The server comprises a central processing unit (CPU) 40 for executing software programs and managing and controlling the operation of the processing means. The CPU 40 is connected to a number of devices via a bus 41, the devices including one or more storage devices 42, for example: a hard disk drive, floppy disk drive, optical disk drive and/or magnetic tape drive for storing system and application software and memory devices including ROM 44 and RAM 45. The server further includes communications interfaces 47 for interfacing to external network components (for example other components within the computer telephony system of FIG. 1). The server can also include user input/output devices such as a mouse and keyboard (not shown) connected to the bus 41 via an input/output port 46, as well as a display 48. It will be understood by the skilled person that the above described architecture is not limiting, but is merely an example of typical server architecture. It will be further understood that the described server has all the necessary operating and application software to enable it to fulfil its purpose.

As will be understood by those skilled in the art, the invention may be implemented in software loaded onto one or more general purpose computers, such as that represented in FIG. 4, any or all of which software may be contained on a computer program product such as a floppy disc, CD-ROM, or magnetic tape so that the program can be loaded onto the one or more general purpose computers. The computer program product used to implement the invention may be embodied on any suitable carrier readable by a suitable computer input device, such as CD-ROM, optically readable marks, magnetic media.

The above embodiments are to be understood as illustrative examples of the invention. Further embodiments of the invention are envisaged and will be evident to the skilled reader. It is to be understood that any feature described in relation to any one embodiment may be used in combination with one or more features of another of the embodiments, or any combination of the embodiments. Furthermore, equivalents and modifications not described above may also be employed without departing from the scope of the invention, which is defined in the accompanying claims.

Although described above for reasons of clarity in terms of telephones and telephony, the invention is equally relevant to other means of communication, for example in applications featuring SIP. In addition to voice calls, the invention could equally apply to the controlling of calls involving video, or any other media.

It should be noted that the number called can differ from the number selected by the user from the screen as a number to dial, i.e. with the addition of access codes. This invention can be used to hide specific number translations, e.g.: according to company policy. The invention is not restricted to corporate phone systems but has application in any CTI telephony system comprising more than one phone.

What is claimed is:

1. A method of policing a call request in a computer telephony (CTI) system comprising a plurality of computer terminals and a plurality of telephone terminals, in which a user is associated with a set of permissions; the method comprising:

receiving at a CTI server from the user via one of the computer terminals a request to set up a call to a destination telephone terminal;
in which the call set-up request identifies the user;
in which the CTI server compares the call set-up request with the set of permissions associated with the user; and allows or blocks the call set-up request depending on the permissions;
in which the call set-up request is associated with a source telephone terminal and a number identifying the destination telephone terminal; in which the source telephone terminal is an extension to a first PBX;
in which the CTI server forwards an allowed call set-up request to the first PBX;
in which the first PBX comprises call barring settings relating to the source telephone terminal, in which the first PBX call barring settings are configured to block the call to the destination telephone number;
in which to enable the call at the first PBX, the CTI server adds a special prefix to the destination telephone number before forwarding the allowed call set-up request to the first PBX; and
in which the CTI server instructs a second PBX to call the source telephone terminal, and the destination telephone number to set up the requested call.

2. A method as claimed in claim 1, in which the CTI server alters the destination telephone number before forwarding the call set-up request to the first PBX.

3. A method as claimed in claim 1 in which the CTI server directs the first PBX to route the requested call via a specific trunk.

4. A method as claimed in claim 1 in which the CTI server directs the first PBX to route the requested call via a second PBX.

5. A method as claimed in claim 4 in which the second PBX allows or blocks the call set-up request depending on the result of a comparison of the call set-up request with the set of permissions associated with the user.

6. A method as claimed in claim 4 in which the second PBX allows or blocks the call set-up request depending on the result of checking call validation data provided by the CTI server.

7. A method as claimed in claim 1 including:
receiving at the CTI server from the first PBX notification of an incoming call, in which the notification comprises the identity of the source of the request and the destination telephone number of the request;
identifying at the CTI server a user linked in the CTI system with the destination telephone number;
checking the identity of the source of the request against the permissions associated with the identified user; and
blocking or allowing the call based on the result of the check.

8. A non-transitory computer readable medium storing processor executable instructions for causing the method of claim 1 to be carried out when run on a computer.

9. A system for policing call requests originating in a computer telephony (CTI) system, in which the computer telephony system comprises a plurality of computer terminals and a plurality of telephone terminals, the system comprising:
a store for storing a set of permissions associated with a user; and for storing a registration associating a computer terminal with a source telephone terminal; and
a CTI server for receiving from the user via the computer terminal a request to set up a call from the source telephone terminal to a destination telephone terminal;

in which the call set-up request comprises a user identifier; in which the identifier is associated in the store with the set of permissions;

in which the CTI server is arranged in use to:

compare the call set-up request with the set of permissions; and to allow or block the call set-up request depending on the permissions;

in which the call set-up request is associated with the source telephone terminal and a number identifying the destination telephone terminal; in which the source telephone terminal is an extension to a first PBX; in which the first PBX comprises call barring settings relating to the source telephone terminal; in which the first PBX call barring settings are configured to bar the destination telephone number; and in which the system further comprises:

a CTI server interface for forwarding an allowed call set-up request to the first PBX; in which the CTI server interface is configured to enable the call at the first PBX by adding a special prefix to the destination telephone number before forwarding the call set-up request to the first PBX; wherein:

the CTI server is configured to instruct a second PBX to call the source telephone terminal, and the destination telephone number to set up the requested call.

10. A system as in claim 9, wherein the CTI server is configured to alter the destination telephone number before forwarding the call set-up request to the first PBX.

11. A system as in claim 9 wherein the CTI server is configured to direct the first PBX to route the requested call via a specific trunk.

12. A system as in claim 9 wherein the CTI server is configured to direct the first PBX to route the requested call via the second PBX.

13. A system as in claim 12 wherein the second PBX is configured to allow or block the call set-up request depending on the result of a comparison of the call set-up request with the set of permissions associated with the user.

14. A system as in claim 12 wherein the second PBX is configured to allow or block the call set-up request depending on the result of checking call validation data provided by the CTI server.

15. A system as in claim 9 wherein: the CTI server is configured to receive from the first PBX notification of an incoming call, in which the notification comprises the identity of the source of the request and the destination telephone number of the request;

the CTI server is configured to identify a user linked in the CTI system with the destination telephone number;

the identity of the source of the request is checked against the permissions associated with the identified user; and the call is blocked or allowed based on the result of the check.

16. The method of claim 1, in which the first PBX call barring settings are configured to allow the call to the destination telephone number with the special prefix.

17. The system of claim 9, in which the first PBX call barring settings are configured to allow the call to the destination telephone number with the special prefix.

\* \* \* \* \*